(12) United States Patent
Shoji et al.

(10) Patent No.: US 12,540,695 B2
(45) Date of Patent: Feb. 3, 2026

(54) CONVERSION PIPE ARRANGEMENT, SUBSTRATE PROCESSING APPARATUS, METHOD OF PROCESSING SUBSTRATE, AND METHOD OF MANUFACTURING SEMICONDUCTOR DEVICE

(71) Applicant: Kokusai Electric Corporation, Tokyo (JP)

(72) Inventors: Takuto Shoji, Toyama (JP); Ryosuke Takahashi, Toyama (JP); Masakazu Sakata, Toyama (JP)

(73) Assignee: KOKUSAI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 18/354,264

(22) Filed: Jul. 18, 2023

(65) Prior Publication Data
US 2024/0093813 A1 Mar. 21, 2024

(30) Foreign Application Priority Data
Sep. 15, 2022 (JP) ................................. 2022-146798

(51) Int. Cl.
*F16L 27/10* (2006.01)
*F16L 25/00* (2006.01)
*F16L 25/14* (2006.01)
*F16L 27/11* (2006.01)

(52) U.S. Cl.
CPC .......... *F16L 27/1012* (2013.01); *F16L 25/14* (2013.01); *F16L 27/11* (2013.01); *F16L 25/0009* (2013.01)

(58) Field of Classification Search
CPC ..... F16L 27/1012; F16L 27/11; F16L 27/108; F16L 25/14; F16L 25/0009; F16L 23/14; F16L 9/17
See application file for complete search history.

(56) References Cited

U.S. PATENT DOCUMENTS

| 3,324,534 A | * | 6/1967 | Spurk ..................... F16L 25/14 |
| 2008/0023959 A1 | * | 1/2008 | Crawford ............... F16L 25/14 |
| 2010/0050945 A1 | | 3/2010 | Morita et al. |
| 2012/0049511 A1 | * | 3/2012 | Bell ........................ F16L 27/11 |
| 2012/0125465 A1 | | 5/2012 | Bell et al. |

(Continued)

FOREIGN PATENT DOCUMENTS

| CN | 102537533 B | 4/2015 |
| CN | 104633330 A * | 5/2015 |

(Continued)

OTHER PUBLICATIONS

WO-2013086892—A1—Machine Translation—English (Year: 2013).*

(Continued)

*Primary Examiner* — William S. Choi
(74) *Attorney, Agent, or Firm* — Volpe Koenig

(57) ABSTRACT

There is provided a technique that includes: a first connector including a first opening including two longitudinally extending parallel sides and configured to provide a detachable connection to an opening of a first counterpart; and a second connector including a substantially circular second opening and configured to be connectable to an opening of a second counterpart; and a pipe including an internal space formed in a shape of a polyhedron and configured to allow fluid communication between the first opening and the second opening.

20 Claims, 7 Drawing Sheets

(56) References Cited

U.S. PATENT DOCUMENTS

2018/0087152 A1 3/2018 Yoshida
2019/0032998 A1 1/2019 Jdira et al.

FOREIGN PATENT DOCUMENTS

| CN | 105023293 A | 11/2015 |
| CN | 113982732 A | 1/2022 |
| CN | 215853284 A | 2/2022 |
| JP | H10-321531 A | 12/1998 |
| JP | 2004-104034 A | 4/2004 |
| JP | 2005-243949 A | 9/2005 |
| JP | 2005-353951 A | 12/2005 |
| JP | 2010-056300 A | 3/2010 |
| JP | 2012-174725 A | 9/2012 |
| JP | 2016-023625 A | 2/2016 |
| JP | 2019-145600 A | 8/2019 |
| JP | 2020-528667 A | 9/2020 |
| KR | 1320550 B1 * | 10/2013 |
| KR | 2015132824 A * | 11/2015 |
| KR | 20150132824 A | 11/2015 |
| WO | WO-2013086892 A1 * | 6/2013 |

OTHER PUBLICATIONS

KR-1320550-B1—Machine Translation—English (Year: 2013).*
CN-104633330-A—Machine Translation—English (Year: 2015).*
KR-2015132824-A—Machine Translation—English (Year: 2015).*
Extended European Search Report issued on Feb. 14, 2024 for European Patent Application No. 23186121.2.
Japanese Office Action issued on Nov. 5, 2024 for Japanese Patent Application No. 2022-146798.
Korean Office Action issued on Dec. 5, 2025 for Korean Patent Application No. 10-2023-0093851.

* cited by examiner

CONVERSION PIPE ARRANGEMENT, SUBSTRATE PROCESSING APPARATUS, METHOD OF PROCESSING SUBSTRATE, AND METHOD OF MANUFACTURING SEMICONDUCTOR DEVICE

CROSS-REFERENCE TO RELATED APPLICATION

This application is based upon and claims the benefit of priority from Japanese Patent Application No. 2022-146798, filed on Sep. 15, 2022, the entire contents of which are incorporated herein by reference.

TECHNICAL FIELD

The present disclosure relates to a conversion pipe arrangement, a substrate processing apparatus, a method of processing a substrate, and a method of manufacturing a semiconductor device.

BACKGROUND

In the related art, as a process of manufacturing a semiconductor device, a processing gas flows through a reaction tube in which a substrate is processed, and a processed gas is discharged by a vacuum pump connected to the reaction tube through an exhaust pipe including a plurality of pipe arrangements.

Depending on a structure of the pipe arrangements that constitute the exhaust pipe, stagnation of a gas flow may occur and by-products may easily accumulate, resulting in generation of particles.

SUMMARY

Some embodiments of the present disclosure provide a technique capable of reducing stagnation of a gas flow in an exhaust pipe.

According to some embodiments of the present disclosure, there is provided a technique that includes: a first connector including a first opening including two longitudinally extending parallel sides and configured to provide a detachable connection to an opening of a first counterpart; and a second connector including a substantially circular second opening and configured to be connectable to an opening of a second counterpart; and a pipe including an internal space formed in a shape of a polyhedron and configured to allow fluid communication between the first opening and the second opening.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
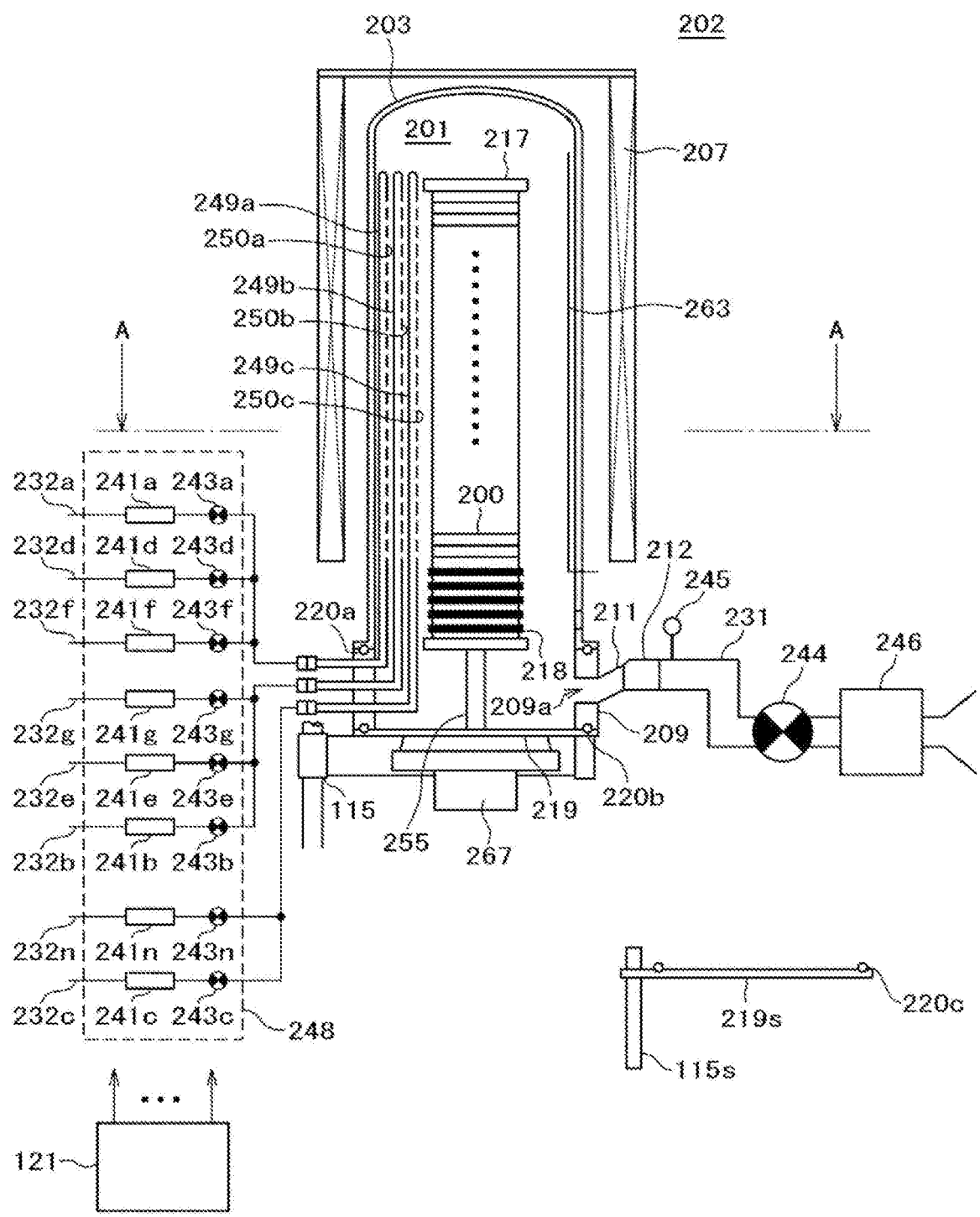
FIG. 1 is a schematic configuration diagram of a vertical process furnace of a substrate processing apparatus suitably used in some embodiments of the present disclosure, in which a portion of the process furnace is illustrated in a vertical cross-sectional view.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components are not been described in detail so as not to obscure aspects of the various embodiments.

Embodiments of the Present Disclosure

Embodiments of the present disclosure will be described below mainly with reference to FIGS. 1 to 7. The drawings used in the following description are schematic. Dimensional relationships, ratios, and the like among the respective components shown in the drawings may not match actual ones. Further, even among a plurality of drawings, dimensional relationships, ratios, and the like among the respective components may not match one another.

(1) Configuration of Substrate Processing Apparatus

As shown in FIG. 1, a process furnace 202 includes a heater 207 as a temperature regulator (heating part). The heater 207 is formed in a cylindrical shape and is vertically installed by being supported by a holding plate. The heater 207 also functions as an activator (exciter) configured to activate (excite) a gas with heat.

Inside the heater 207, a reaction tube 203 is arranged concentrically with the heater 207. The reaction tube 203 is made of, for example, a heat-resistant material such as quartz ($SiO_2$) or silicon carbide (SiC) and is formed in a cylindrical shape with an upper end thereof closed and a lower end thereof opened. Below the reaction tube 203, a manifold (inlet) 209 is arranged concentrically with the reaction tube 203. The manifold 209 is made of, for example, a metallic material such as stainless steel (SUS) or the like and is formed in a cylindrical shape with upper and lower ends thereof opened. The upper end of the manifold 209 is engaged with the lower end of the reaction tube 203 and is configured to support the reaction tube 203. An O-ring 220a as a seal is provided between the manifold 209 and the reaction tube 203. The reaction tube 203 is installed vertically in the same manner as the heater 207. A process container (reaction container) mainly includes the reaction tube 203 and the manifold 209. A process chamber 201 is formed in a cylindrical hollow area of the process container. The process chamber 201 is configured to be capable of accommodating a wafer 200 as a substrate. The wafer 200 is processed in the process chamber 201.

Nozzles 249a to 249c as first to third suppliers are installed in the process chamber 201 so as to penetrate a side wall of the manifold 209. The nozzles 249a to 249c are also referred to as first to third nozzles, respectively. The nozzles 249a to 249c are made of, for example, a heat-resistant material such as quartz or SiC. Gas supply pipes 232a to 232c are connected to the nozzles 249a to 249c, respectively. The nozzles 249a to 249c are different nozzles, and the nozzles 249a and 249c are provided adjacent to the nozzle 249b.

At the gas supply pipes 232a to 232c, mass flow controllers (MFCs) 241a to 241c, which are flow rate controllers (flow rate control parts), and valves 243a to 243c, which are on-off valves, are respectively installed sequentially from the upstream side of a gas flow. Gas supply pipes 232d and 232f are respectively connected to the gas supply pipe 232a on the downstream side of the valve 243a. Gas supply pipes 232e and 232g are respectively connected to the gas supply pipe 232b on the downstream side of the valve 243b. A gas supply pipe 232h is connected to the gas supply pipe 232c on the downstream side of the valve 243c. At the gas supply pipes 232d to 232h, MFCs 241d to 241h and valves 243d to 243h are respectively installed sequentially from the upstream side of a gas flow. The gas supply pipes 232a to 232h are made of, for example, a metal material such as stainless steel or the like.

Figure 2:
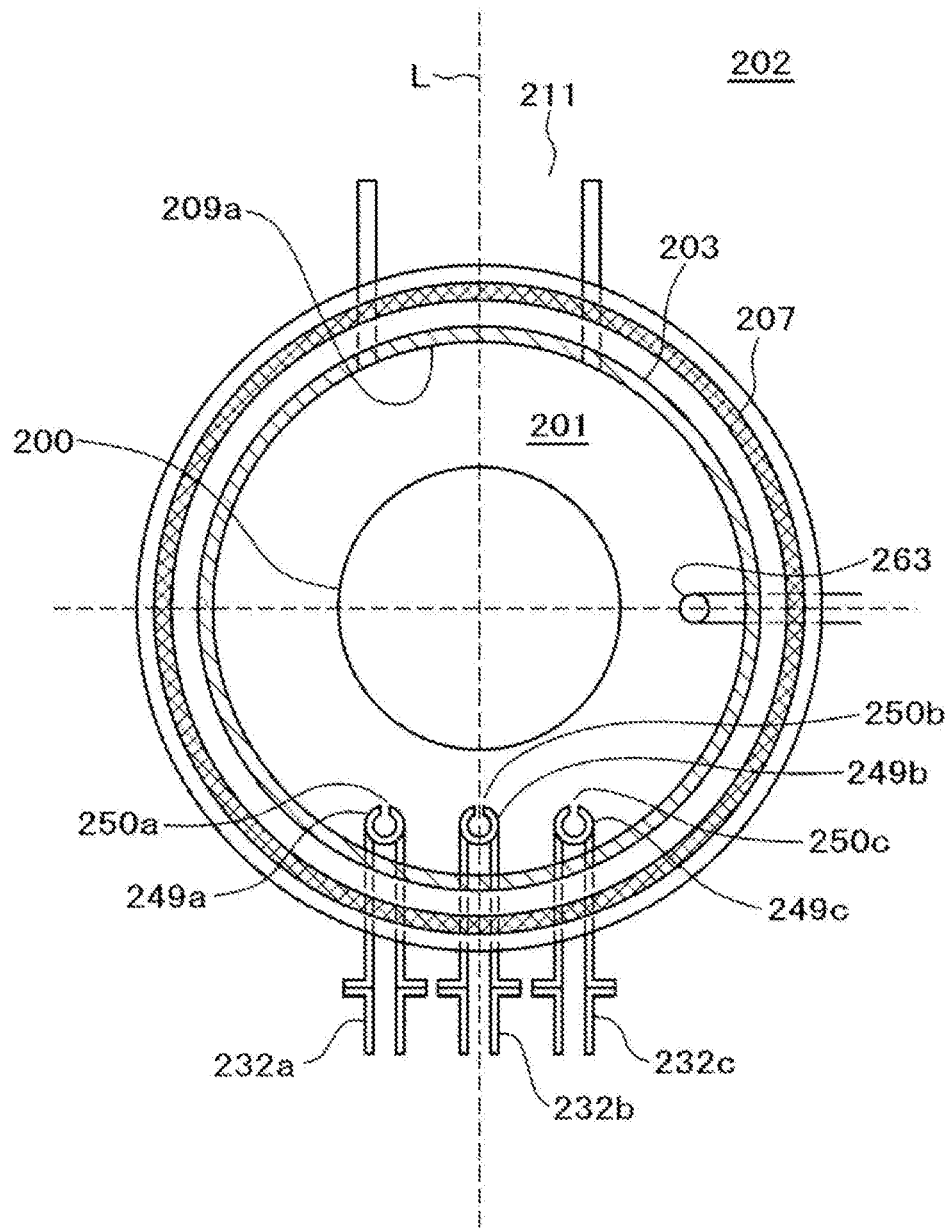
FIG. 2 is a schematic configuration diagram of the vertical process furnace of the substrate processing apparatus suitably used in the embodiments of the present disclosure, in which the portion of the process furnace is illustrated in a cross-sectional view taken along line A-A in FIG. 1.

As shown in FIG. 2, the nozzles 249a to 249c are arranged in a space of an annular shape in a plane view between an inner wall of the reaction tube 203 and the wafers 200 and are installed to extend upward in an arrangement direction of the wafers 200 from a lower end to an upper end of the inner wall of the reaction tube 203. In other words, the nozzles 249a to 249c are respectively installed in a region horizontally surrounding a wafer arrangement region, in which the wafers 200 are arranged, on the lateral side of the wafer arrangement region so as to extend along the wafer arrangement region. In a plane view, the nozzle 249b is arranged to face the below-described exhaust port 209a on a straight line across centers of the wafers 200 loaded into the process chamber 201. The nozzles 249a and 249c are arranged to sandwich a straight line L passing through the nozzle 249b and a center of the exhaust port 209a from both sides along the inner wall of the reaction tube 203 (outer periphery of the wafers 200). The straight line L is also a straight line passing through the nozzle 249a and the centers of the wafers 200. That is, it may be said that the nozzle 249c is installed on the side opposite the nozzle 249a with the straight line L interposed therebetween. The nozzles 249a and 249c are arranged line-symmetrically with the straight line L as an axis of symmetry. Gas supply holes 250a to 250c configured to supply gases are formed on the side surfaces of the nozzles 249a to 249c, respectively. The gas supply holes 250a to 250c are respectively opened to face the exhaust port 209a in a plane view and are configured to be capable of supplying gases toward the wafers 200. The gas supply holes 250a to 250c are formed from the lower side to the upper side of the reaction tube 203.

From the gas supply pipe 232a, a nitriding gas is supplied into the process chamber 201 via the MFC 241a, the valve 243a and the nozzle 249a.

From the gas supply pipe 232b, a precursor gas is supplied into the process chamber 201 via the MFC 241b, the valve 243b, and the nozzle 249b.

From the gas supply pipe 232c, an etching gas is supplied into the process chamber 201 via the MFC 241c, the valve 243c, and the nozzle 249c.

From the gas supply pipe 232d, an oxidizing gas is supplied into the process chamber 201 via the MFC 241d, the valve 243d, the gas supply pipe 232a, and the nozzle 249a.

From the gas supply pipe 232e, a reducing gas is supplied into the process chamber 201 via the MFC 241e, the valve 243e, the gas supply pipe 232b, and the nozzle 249b.

From the gas supply pipes 232f to 232h, an inert gas is supplied into the process chamber 201 via the MFCs 241f to 241h, the valves 243f to 243h, the gas supply pipes 232a to 232c, and the nozzles 249a to 249c, respectively. The inert gas acts as a purge gas, a carrier gas, a diluting gas, and the like.

A nitriding gas supply system mainly includes the gas supply pipe 232a, the MFC 241a, and the valve 243a. A precursor gas supply system mainly includes the gas supply pipe 232b, the MFC 241b, and the valve 243b. An etching gas supply system mainly includes the gas supply pipe 232c, the MFC 241c, and the valve 243c. An oxidizing gas supply system mainly includes the gas supply pipe 232d, the MFC 241d, and the valve 243d. A reducing gas supply system mainly includes the gas supply pipe 232e, the MFC 241e, and the valve 243e. An inert gas supply system mainly includes the gas supply pipes 232f to 232h, the MFCs 241f to 241h, and the valves 243f to 243h.

Among the various supply systems described above, any one or the entirety of the supply systems may be configured as an integrated supply system 248 in which the valves 243a to 243h, the MFCs 241a to 241h and the like are integrated. The integrated supply system 248 is connected to each of the gas supply pipes 232a to 232h. The integrated supply system 248 is configured such that an operation of supplying various substances (various gases) into the gas supply pipes 232a to 232h, i.e., an opening/closing operation of the valves 243a to 243h, a flow rate regulation operation by the MFCs 241a to 241h, and the like are controlled by a controller 121 to be described later. The integrated supply system 248 is configured as a one-piece type or divided integrated unit. The integrated supply system 248 may be attached to and detached from the gas supply pipes 232a to 232h on an integrated unit basis. Maintenance, replacement, expansion, and the like of the integrated supply system 248 may be performed on an integrated unit basis.

An exhaust port 209a configured to exhaust the atmosphere in the process chamber 201 is formed at the side wall of the manifold 209. As shown in FIG. 2, the exhaust port 209a is formed at a position facing the nozzles 249a to 249c (gas supply holes 250a to 250c) with the wafers 200 interposed therebetween in a plane view. The exhaust port 209a may be provided to extend from the lower side to the upper side of the side wall of the reaction tube 203, i.e., along the wafer arrangement region. An exhaust pipe 231 is connected to the exhaust port 209a via an exhaust port 211 and a conversion pipe arrangement 212, which will be described later. A vacuum pump 246 as a vacuum exhauster is connected to the exhaust pipe 231 via a pressure sensor 245 as a pressure detector (pressure detection part) configured to detect the pressure inside the process chamber 201 and an APC (Auto Pressure Controller) valve 244 as a pressure regulator (pressure regulation part). The APC valve 244 may perform or stop a vacuum exhaust of the interior of the process chamber 201 by being opened and closed in a state in which the vacuum pump 246 is operated. Further, the APC valve 244 is configured to be capable of regulating the pressure inside the process chamber 201 by adjusting a valve opening state based on the pressure information detected by the pressure sensor 245 in a state in which the vacuum pump 246 is operated. An exhaust system mainly includes the exhaust pipe 231, the APC valve 244, and the pressure sensor 245. The vacuum pump 246 may be included in the exhaust system.

A seal cap 219 as a furnace opening lid capable of airtightly closing the lower end opening of the manifold 209 is installed below the manifold 209. The seal cap 219 is made of a metallic material such as, for example, stainless steel or the like, and is formed in a disc shape. An O-ring 220b as a seal, which comes into contact with the lower end of the manifold 209, is installed on the upper surface of the seal cap 219. A rotator 267 configured to rotate a boat 217, which will be described below, is installed below the seal cap 219. A rotary shaft 255 of the rotator 267 is connected to the boat 217 through the seal cap 219. The rotator 267 is configured to rotate the wafers 200 by rotating the boat 217. The seal cap 219 is configured to be raised or lowered in the vertical direction by a boat elevator 115 as an elevator installed outside the reaction tube 203. The boat elevator 115 is configured as a transfer apparatus (transfer mechanism) configured to load or unload (transfer) the wafers 200 into or out of the process chamber 201 by raising or lowering the seal cap 219.

Below the manifold 209, a shutter 219s is installed as a furnace opening lid capable of airtightly closing the lower end opening of the manifold 209 in a state in which the seal cap 219 is lowered and the boat 217 is unloaded from the process chamber 201. The shutter 219s is made of, for example, a metallic material such as stainless steel or the like and is formed in a disc shape. An O-ring 220c as a seal that comes into contact with the lower end of the manifold 209 is installed on the upper surface of the shutter 219s. The opening/closing operations (elevation operation, rotation operation, and the like) of the shutter 219s are controlled by a shutter opening/closing mechanism 115s.

A boat 217 serving as a substrate support is configured to support a plurality of wafers 200, for example, 25 to 200 wafers 200 in such a state that the wafers 200 are arranged in a horizontal posture and in multiple stages along a vertical direction with the centers of the wafers 200 aligned with one another. That is, as the boat 217 is configured to arrange the wafers 200 to be spaced apart from each other. The boat 217 is made of, for example, a heat-resistant material such as quartz or SiC. Heat insulating plates 218 made of, for example, a heat-resistant material such as quartz or SiC, are supported in multiple stages at the bottom of the boat 217.

A temperature sensor 263 serving as a temperature detector in installed in the reaction tube 203. By regulating a state of supplying an electric power to the heater 207 based on the temperature information detected by the temperature sensor 263, a temperature distribution of the internal temperature of the process chamber 201 becomes a desired temperature distribution. The temperature sensor 263 is installed along the inner wall of the reaction tube 203.

(Exhaust Port)

As shown in FIG. 1, the exhaust port 211 is connected to the exhaust port 209a installed at the side wall of the manifold 209. The exhaust port 211 extends outwardly upward from the manifold 209. The exhaust port 211 may extend outward while descending from the manifold 209. In this regard, the manifold 209 and the exhaust port 211 are joined by welding. The end of the exhaust port 211 opposite the manifold 209 is connected to the exhaust pipe 231 via the conversion pipe arrangement 212. The provision of the exhaust port 211 facilitates connection to the conversion pipe arrangement 212.

Figure 3:
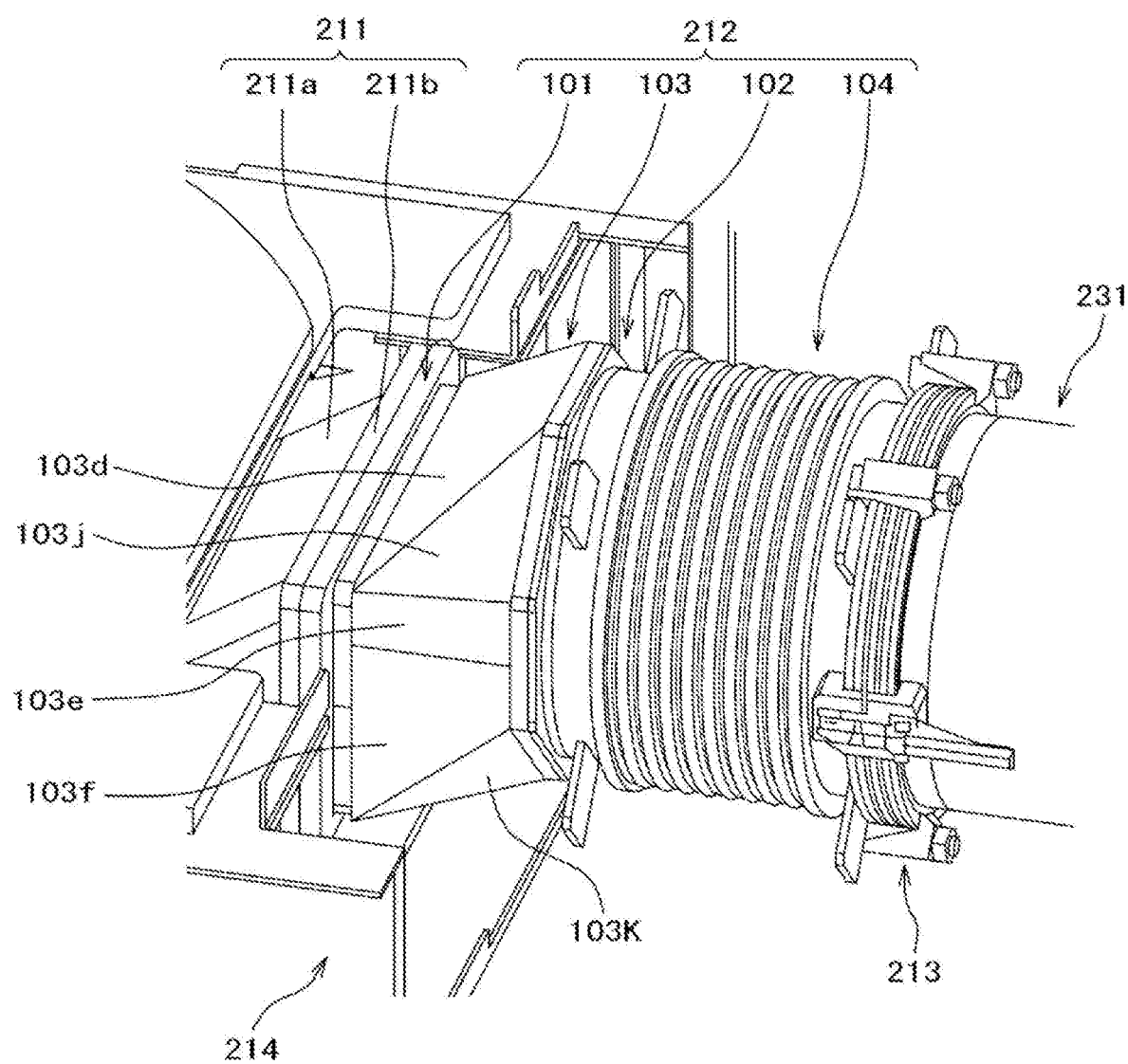
FIG. 3 is a perspective view of an exhaust port, a conversion pipe arrangement, and an exhaust pipe according to the embodiments of the present disclosure.

The exhaust port 209a is formed, for example, in a quadrangular shape (in a shape of a rectangle or substantially in a shape of the rectangle) elongating in the horizontal direction. Specifically, a quadrant is formed at each corner of the quadrangle such that an arc of the quadrant is formed at an outer side of the quadrant. That is, the rectangular or substantially rectangular shape includes two longitudinally extending parallel sides. As shown in FIG. 3, the exhaust port 211 includes a tubular body 211a with a rectangular cross section and a flange 211b provided at a rectangular opening near the conversion pipe arrangement 212. A shape of an opening of the tubular body 211a near the exhaust port 209a (a cross-sectional shape of the tubular body 211a) is formed to match the exhaust port 209a.

(Conversion Pipe Arrangement)

Figure 4:
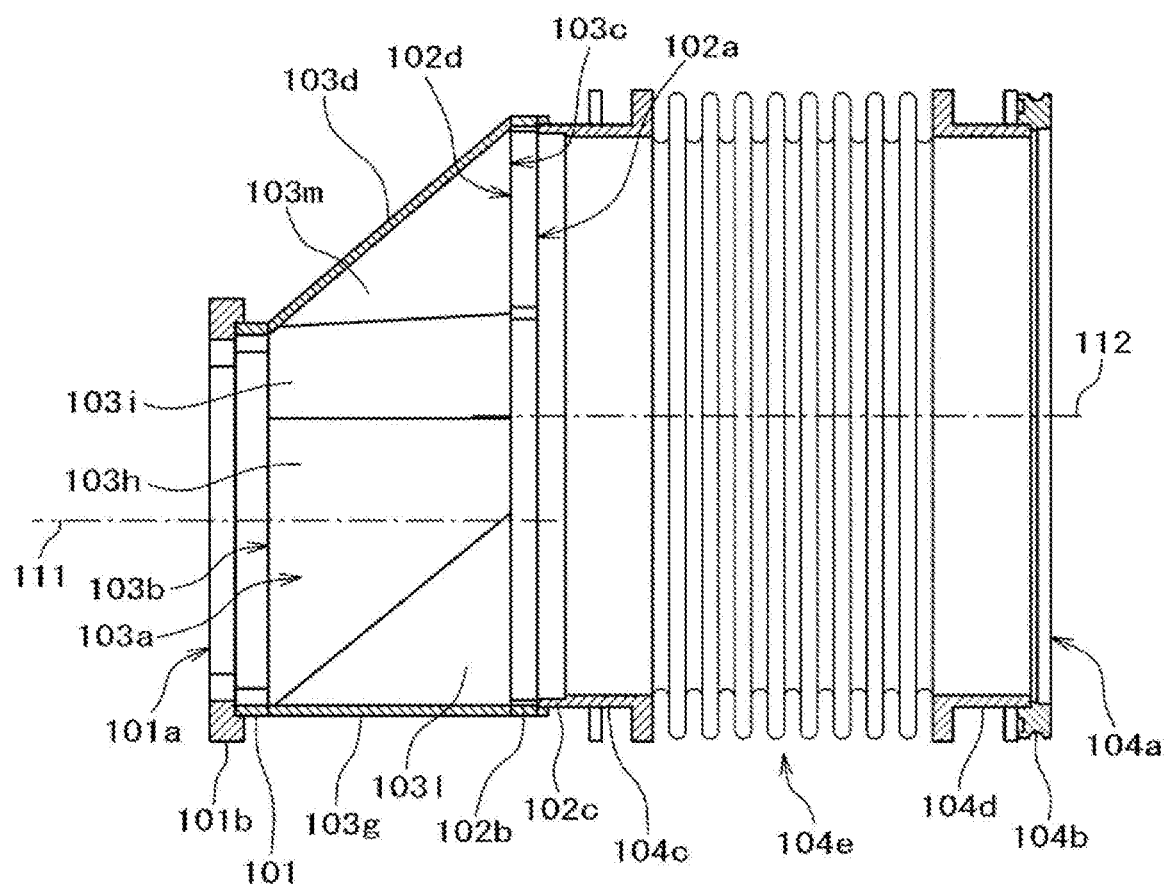
FIG. 4 is a cross-sectional view of a conversion pipe arrangement according to the embodiments of the present disclosure.
Figure 5A:
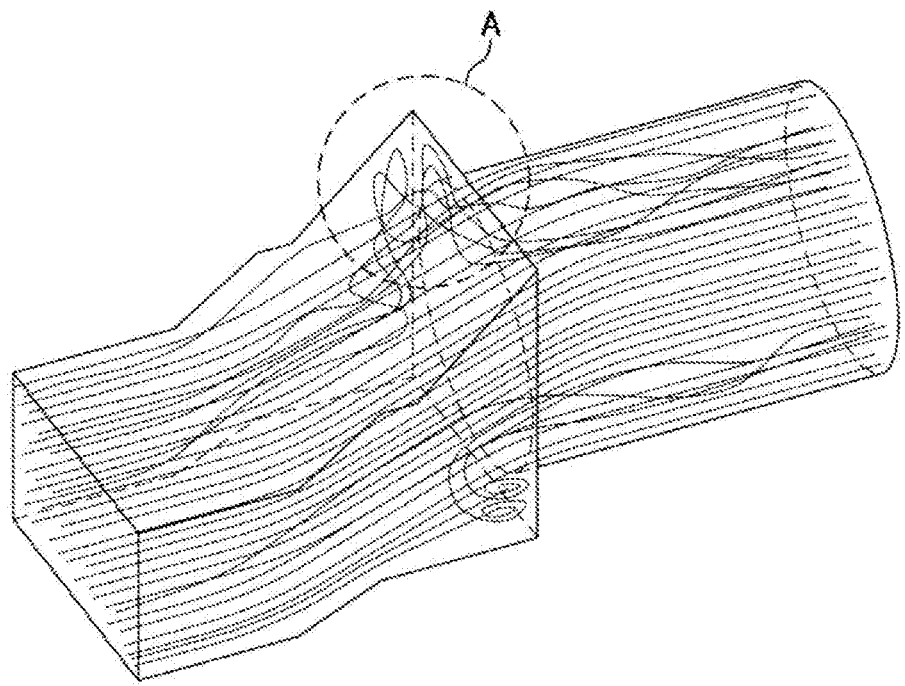
FIG. 5A is a diagram showing a result of a gas flow simulation in a conversion pipe arrangement of a comparative example.
Figure 5B:
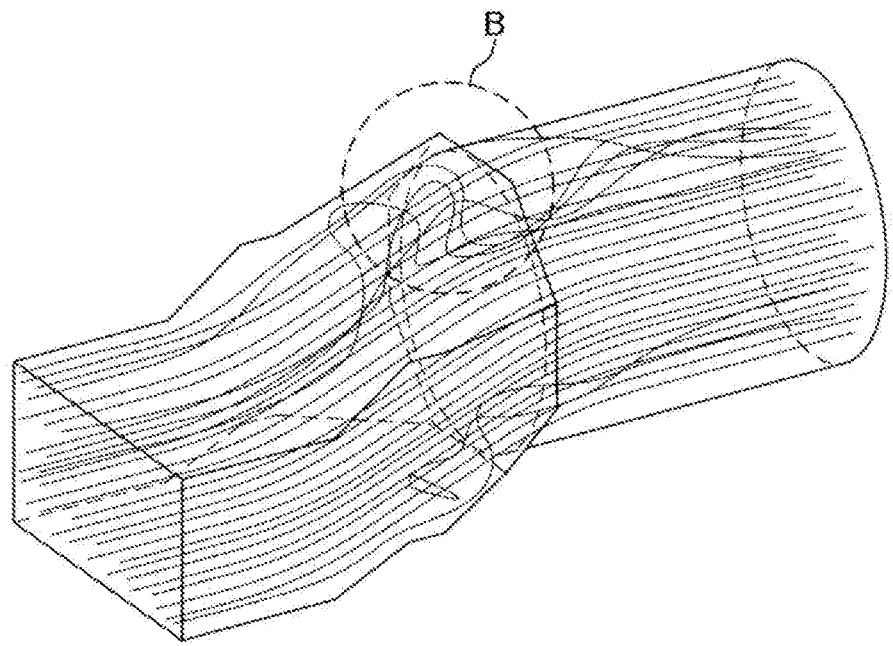
FIG. 5B is a diagram showing a result of a gas flow simulation in a conversion pipe arrangement according to the embodiments of the present disclosure.

A structure of the conversion pipe arrangement will be described with reference to FIGS. 3 and 4. The conversion pipe arrangement 212 includes a first connector 101, a second connector 102, a pipe 103, and a bellows 104. The first connector 101 is formed in a rectangular cross-sectional shape. The second connector 102 is formed in an octagonal cross-sectional shape and a circular cross-sectional shape. The pipe 103 is formed in a shape of a polyhedron to join different cross sections of the first connector 101 and the second connector 102. The bellows 104 connects the second connector 102 and the exhaust pipe 231. The conversion pipe arrangement 212 is formed such that a cross-sectional shape of a first opening 101a near the exhaust port 211 (first counterpart) is different from a cross-sectional shape of an opening 104a near the exhaust pipe 231 (second counterpart).

The shape of the first opening 101a (the cross-sectional shape of the first connector 101) is substantially rectangular, and may match the opening of the exhaust port 211 near the flange 211b. The first connector 101 is provided with a first flange 101b for connection with the flange 211b of the exhaust port 211 at a flat sealing surface. The flange 211b of the exhaust port 211 and the first flange 101b are fixed by bolts at four corners, and a gasket (hollow metallic O-ring) or a typical O-ring is installed as a seal on connecting surfaces thereof. The first connector 101 is detachably connected to the exhaust port 211 while maintaining airtightness.

The second connector 102 includes a frame-like body (plate) 102b including an octagonal contour and a substantially circular second opening 102a, and a circular pipe 102c connected to the second opening 102a and extending toward the exhaust pipe 231. In this regard, the frame-like body 102b and the circular pipe 102c are joined by welding. The frame-like body 102b includes an octagonal opening 102d near the pipe 103, and a cross-sectional area of the opening 102d is larger than a cross-sectional area of the second opening 102a. The frame-like body 102b includes a wall, which fills a step between the opening 102d and the second opening 102a, near the circular pipe 102c. A shape of the opening of the circular pipe 102c (the cross-sectional shape of the circular pipe 102c) is formed to match the second opening 102a. With such a configuration, the second connector 102 may be connected to the pipe 103 and the bellows 104.

The bellows 104 includes a circular tubular body 104c connected to the circular pipe 102c of the second connector 102, a circular tubular body 104*d* connected to the exhaust pipe 231, and a connector 104*e* configured to connect the circular tubular body 104*c* and the circular tubular body 104*d* in an extendable and bendable manner. In this regard, the circular tubular body 104*c* and the circular pipe 102*c*, the circular tubular body 104*c* and the connector 104*e*, and the connector 104*e* and the circular tubular body 104*d* are respectively joined by welding.

The shape of the opening of the circular tubular body 104*c* near the second connector 102 (the cross-sectional shape of the circular tubular body 104*c*) is formed to match the opening of the circular pipe 102*c*. Further, the circular tubular body 104*d* is formed such that, for connection with the exhaust pipe 231 with a circular cross section, the shape of the opening 104*a* is formed in a shape of a circle of the same configuration as the exhaust pipe 231. A second flange 104*b* for connection with the exhaust pipe 231 at a flat sealing surface is installed at the opening 104*a*.

The bellows 104 connects the second opening 102*a* of the second connector 102 and the opening 104*a* in a fluid communication state. That is, the second opening 102*a* is configured to be connectable to the exhaust pipe 231. Thus, the second opening 102*a* is connected to the vacuum pump 246. The exhaust pipe 231 and the second flange 104*b* are fixed by a claw clamp 213, and a gasket (hollow metallic O-ring) or a typical O-ring is installed as a seal on the connection surface. As a result, the bellows 104 is detachably connected to the exhaust pipe 231 while maintaining airtightness. In addition, since the bellows 104 is extendable, the connection between the conversion pipe arrangement 212 and the exhaust pipe 231 is facilitated.

The pipe 103 includes an internal space 103*a* formed in the shape of the polyhedron. The polyhedron includes an open surface 103*b* connected to the first connector 101, an open surface 103*c* connected to the second connector 102, six trapezoidal surfaces, and four triangular surfaces arranged between each of the trapezoidal surfaces. In this regard, a shape of the open surface 103*b* connected to the first connector 101 is formed in a rectangular shape. This makes it possible to match with the rectangular first opening 101*a*. A shape of the open surface 103*c* connected to the second connector 102 is formed in an octagonal shape. This makes it possible to match with the octagonal opening 102*d*. The polyhedron formed by combining the trapezoidal surfaces and the triangular surfaces allow shape transformation. For example, when the shape of the open surface 103*c* connected to the second connector 102 is hexagonal, two triangular surfaces are provided.

The pipe 103 is welded to the first connector 101 and the second connector 102. A triangular surface 103*j* is arranged between the trapezoidal surface 103*d* and the trapezoidal surface 103*e*, a triangular surface 103*k* is arranged between the trapezoidal surface 103*f* and the trapezoidal surface 103*g*, a triangular surface 103*l* is arranged between the trapezoidal surface 103*g* and the trapezoidal surface 103*h*, and a triangular surface 103*m* is arranged between the trapezoidal surface 103*i* and the trapezoidal surface 103*d*.

The pipe 103 may be formed by mechanically bending a flat plate made of an alloy containing nickel as a main component to form two half pipes (shells), and airtightly joining the two half pipes by welding. In this case, one of the half pipes includes trapezoidal surfaces 103*d*, 103*e*, and 103*i*, and triangular surfaces 103*j* and 103*m*, and the other of the half pipes includes trapezoidal surfaces 103*f*, 103*g*, and 103*h* and triangular surfaces 103*k* and 103I. A plane including a connection surface between the trapezoidal surface 103*e* and the trapezoidal surface 103*f* and a connection surface between the trapezoidal surface 103*i* and the trapezoidal surface 103*h* is perpendicular to the first opening 101*a* or the second opening 102*a*. According to this configuration, a bending angle becomes 90 degrees or less, and the welding may be performed outside the pipe, which improves a workability.

The trapezoidal surfaces 103*e* and 103*f* may be formed by one flat plate or curved plate including a trapezoidal contour, and the trapezoidal surfaces 103*h* and 103*i* may be formed by one flat plate or curved plate including a trapezoidal contour. In this case, the pipe 103 includes four trapezoidal surfaces and four triangular surfaces. Other trapezoidal surfaces 103*d* and 103*g* are formed by flat plates or curved plates including a trapezoidal contour, the triangular surfaces 103*j* to 103*m* are formed by flat plates or curved plates including a triangular contour, and the pipe 103 is constructed by welding sides of the trapezoidal surfaces and the triangular surfaces. Each plate has a thickness enough to bare the differential pressure of 101 kPa.

With the configuration described above, the pipe 103 provides fluid communication between the first opening 101*a* and the second opening 102*a*. Further, the first opening 101*a* is connected to the process chamber 201, and the second opening 102*a* is connected to the vacuum pump 246. Thus, the process chamber 201 and the vacuum pump 246 are in fluid communication.

The first opening 101*a* and the second opening 102*a* are formed parallel to each other to open in opposite directions to the pipe 103. The first straight line (pipe axis) 111 perpendicularly passing through a center of the first opening 101*a* does not coincide with the second straight line (pipe axis) 112 perpendicularly passing through a center of the second opening 102*a*. This allows offset conversion. The first straight line 111 and the second straight line 112 are parallel to each other and are spaced apart from each other in a direction (vertical direction) perpendicular to the longitudinal direction of the first opening 101*a*. This allows offset conversion in the vertical direction. This makes it possible to reduce a deviation between a direction in which a line connecting the center of the first opening 101*a* and the center of the second opening 102*a* extends and a direction in which a center line of the exhaust port 211 extending upward and outward extends.

Further, an area of the second opening 102*a* is equal to or larger than an area of the first opening 101*a*, and the pipe 103 is configured such that a flow path cross-sectional area continuously changes between the open surface 103*b* connected to the first connector 101 and the open surface 103*c* connected to the second connector 102.

As shown in FIG. 3, the conversion pipe arrangement 212 may be arranged such that the second connector 102 is flush with one surface of a casing 214 of the reaction tube 203, or the entirety of the conversion pipe arrangement 212 may be accommodated in the casing 214. As a result, in a modular-designed substrate processing apparatus, it is possible to maintain a compatibility of connection of pipe arrangements.

Comparative Example

A conversion pipe arrangement in a comparative example is formed as a quadrangular pipe arrangement such that an opening near an exhaust port 211 is formed in the same shape as a rectangular opening of the exhaust port 211 and widens toward the exhaust pipe 231. In this case, a wall surface area, which is a difference between cross-sectional areas of a quadrangular pipe arrangement and a round pipe arrangement, is large, and stagnation of a gas flow is likely to occur as indicated by the dashed circle A in FIG. 5A. Due to this stagnation, by-products due to a residual gas are likely to accumulate, which may generate particles (PC).

Therefore, according to the embodiments of the present disclosure, in the conversion pipe arrangement 212, a connection from the first connector including a rectangular opening to the second connector including a circular opening is changed from a quadrangular shape to a polygonal shape of a five-or-more sided polygon (e.g., an octagonal shape). Thus, the area of the wall surface formed in the second connector 102 is smaller than the area of the wall surface formed by the quadrangular pipe arrangement and the round pipe arrangement. As a result, it is possible to reduce the stagnation of a gas flow, as indicated by the dashed circle B in FIG. 5B. Accordingly, the adhesion of by-products due to the residual gas is reduced, which makes it possible to reduce generation of particles (PC).

Figure 6:
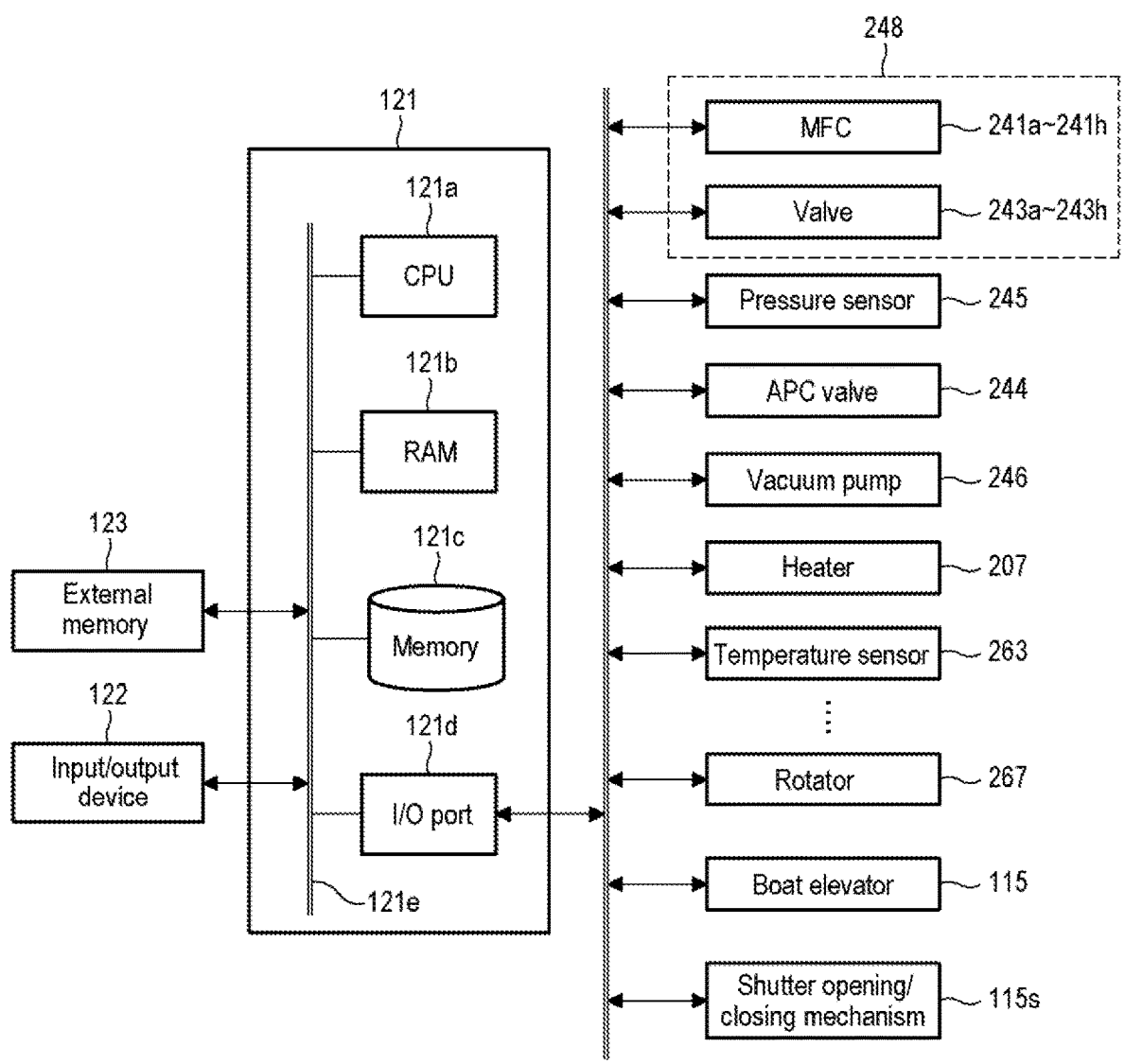
FIG. 6 is a schematic configuration diagram of a controller of a substrate processing apparatus suitably used in the embodiments of the present disclosure, and is a block diagram showing a control system of the controller.

As shown in FIG. 6, the controller 121 as a control part (control means or unit) is configured as a computer including a CPU (Central Processing Unit) 121a, a RAM (Random Access Memory) 121b, a memory 121c and an I/O port 121d. The RAM 121b, the memory 121c and the I/O port 121d are configured to be capable of exchanging data with the CPU 121a via an internal bus 121e. An input/output device 122 configured as, for example, a touch panel or the like is connected to the controller 121. In addition, an external memory 123 may be connected to the controller 121.

The memory 121c includes, for example, a flash memory, a HDD (Hard Disk Drive), a SSD (Solid State Drive), or the like. The memory 121c is configured to be capable of readably storing a control program that controls an operation of the substrate processing apparatus, a process recipe in which procedures and conditions of substrate processing to be described later are written, and the like. The process recipe functions as a program configured to be capable of causing, by the controller 121, the substrate processing apparatus to execute the respective procedures in a substrate processing process to be described below so as to obtain a predetermined result.

Hereinafter, the process recipe, the control program, and the like are collectively and simply referred to as a program. Furthermore, the process recipe is also simply referred to as a recipe. When the term "program" is used herein, it may mean a case of including the recipe, a case of including the control program, or a case of including both the recipe and the control program. The RAM 121b is configured as a memory area (work area) in which programs, data, and the like read by the CPU 121a are temporarily held.

The I/O port 121d is connected to the MFCs 241a to 241h, the valves 243a to 243h, the pressure sensor 245, the APC valve 244, the vacuum pump 246, the temperature sensor 263, the heater 207, the rotator 267, the boat elevator 115, the shutter opening/closing mechanism 115s, and the like, which are described above.

The CPU 121a is configured to be capable of reading and executing the control program from the memory 121c and reading the recipe from the memory 121c in response to an input of an operation command from the input/output device 122 or the like. The CPU 121a is configured to, according to contents of the recipe thus read, be capable of controlling the flow rate regulation operation of various substances (various gases) by the MFCs 241a to 241h, the opening/closing operations of the valves 243a to 243h, and the like. Further, the CPU 121a is configured to, according to the contents of the recipe thus read, be capable of controlling the opening/closing operation of the APC valve 244, the pressure regulation operation by the APC valve 244 based on the pressure sensor 245, the start and stop of the vacuum pump 246, the temperature regulation operation of the heater 207 based on the temperature sensor 263, and the like. In addition, the CPU 121a is configured to, according to the contents of the recipe thus read, be capable of controlling the rotation and the rotation speed adjustment operation of the boat 217 by the rotator 267, the elevation operation of the boat 217 by the boat elevator 115, the opening/closing operation of the shutter 219s by the shutter opening/closing mechanism 115s, and the like.

The controller 121 may be configured by installing, in the computer, the above-described program stored in an external memory 123. The external memory 123 includes, for example, a magnetic disk such as a HDD, an optical disc such as a CD, a magneto-optical disc such as a MO, a semiconductor memory such as a USB memory or a SSD, and so forth. The memory 121c and the external memory 123 are configured as a computer readable recording medium. Hereinafter, the memory 121c and the external memory 123 are collectively and simply referred to as a recording medium. As used herein, the term "recording medium" may include the memory 121c, the external memory 123, or both. The program may be supplied to the computer by using a communication means or unit such as the Internet or a dedicated line instead of using the external memory 123.

(2) Substrate Processing Process

Figure 7:
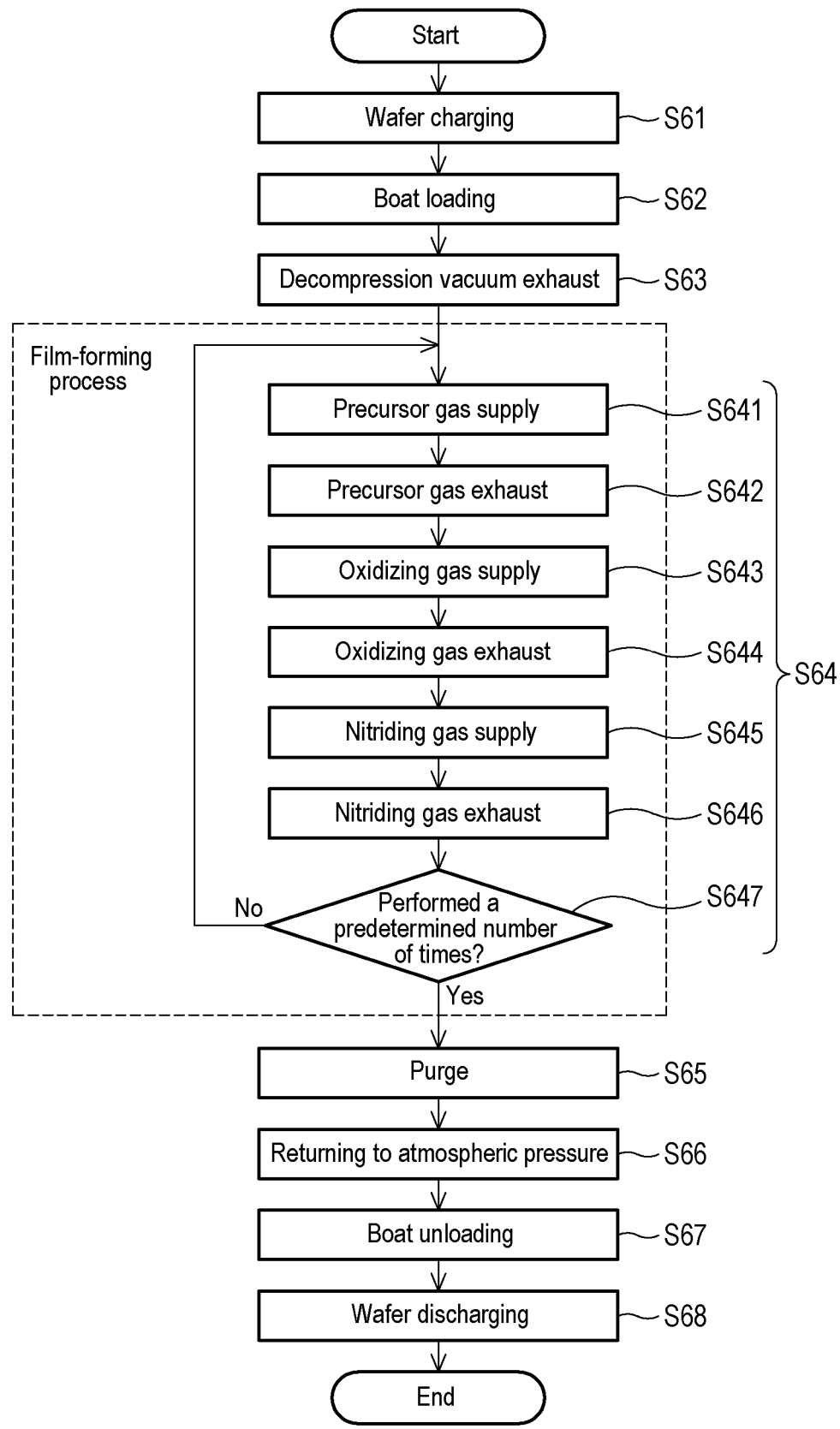
FIG. 7 is a diagram illustrating a process flow according to the embodiments of the present disclosure.

As a process of manufacturing a semiconductor device by using the substrate processing apparatus described above, a method of processing a substrate, i.e., an example of forming a predetermined film on a surface of a wafer 200 as a substrate will be described mainly with reference to FIG. 7. In the following description, operations of the respective components constituting the substrate processing apparatus are controlled by the controller 121.

In the film-forming process according to the embodiments of the present disclosure, a film is formed on the wafer 200 by performing a cycle a predetermined number of times (one or more times), the cycle including non-simultaneously performing:
  (a) supplying a precursor gas to the wafer 200 in a process chamber 201 (S641);
  (b) removing the precursor gas (residual gas) from the process chamber 201 (S642);
  (c) supplying an oxidizing gas to the wafer 200 in the process chamber 201 (S643);
  (d) removing the oxidizing gas (residual gas) from the process chamber 201 (S644);
  (e) supplying a nitriding gas to the wafer 200 in the process chamber 201 (S645); and
  (f) removing the nitriding gas (residual gas) from the process chamber 201 (S646).

The term "wafer" used herein may refer to "a wafer itself" or "a stacked body of a wafer and a predetermined layer or film formed on a surface of the wafer." The expression "a surface of a wafer" used herein may refer to "a surface of a wafer itself" or "a surface of a predetermined layer or the like formed on a wafer." The expression "a predetermined layer is formed on a wafer" used herein may mean that "a predetermined layer is directly formed on a surface of a wafer itself" or that "a predetermined layer is formed on a layer or the like formed on a wafer." The term "substrate" used herein may be synonymous with the term "wafer."

(S61: Wafer Charging, and S62: Boat Loading)

After a plurality of wafers 200 is charged to the boat 217 (wafer charging), the shutter 219s is moved by the shutter opening/closing mechanism 115s to open the lower end opening of the manifold 209 (shutter opening). Thereafter, as shown in FIG. 1, the boat 217 supporting the plurality of wafers 200 is lifted by the boat elevator 115 and loaded into the process chamber 201 (boat loading). In this state, the seal cap 219 seals the lower end of the manifold 209 via the O-ring 220b. Thus, the wafers 200 are loaded into the process chamber 201.

(S63: Decompression Vacuum Exhaust)

After the boat loading is completed, the inside of the process chamber 201, i.e., a space where the wafers 200 are placed, is vacuum-exhausted (decompression-exhausted) by the vacuum pump 246 to reach a desired pressure, for example less than 100 Pa. In this operation, the pressure inside the process chamber 201 is measured by the pressure sensor 245, and the APC valve 244 is feedback-controlled based on the measured pressure information. Further, the wafers 200 in the process chamber 201 are heated by the heater 207 to reach a desired processing temperature (first temperature). In this operation, a state of supplying an electric power to the heater 207 is feedback-controlled based on the temperature information detected by the temperature sensor 263 such that a temperature distribution in the process chamber 201 becomes a desired temperature distribution. Further, the rotation of the wafer 200 by the rotator 267 is started. The exhaust of inside of the process chamber 201 and the heating and rotation of the wafers 200 may be continuously performed at least until the processing on the wafers 200 is completed.

(S64: Film-Forming Process)

After the temperature in the process chamber 201 stabilizes at a preset processing temperature, the following six sub-steps S641, S642, S643, S644, S645, and S646 are executed sequentially. During the execution, the wafers 200 are rotated by rotating the boat 217 via the rotary shaft 255 by the rotator 267.

(S641: Precursor Gas Supply)

In this step, a precursor gas is supplied to the wafers 200 in the process chamber 201 to form a first layer on the outermost surface of the wafer 200. Specifically, the valve 243b is opened to allow the precursor gas to flow through the gas supply pipe 232b. A flow rate of the precursor gas is regulated by the MFC 241b. The precursor gas is supplied to a processing region in the process chamber 201 via the gas supply holes 250b of the nozzle 249b, and discharged from the exhaust pipe 231 via the exhaust port 209a, the exhaust port 211 and the conversion pipe arrangement 212. At the same time, the valve 243g is opened to allow an inert gas to flow through the gas supply pipe 232g. A flow rate of the inert gas is regulated by the MFC 241g. The inert gas is supplied to the processing area in the process chamber 201 together with the precursor gas via the gas supply holes 250b of the nozzle 249b, and discharged from the exhaust pipe 231 through the exhaust port 209a, the exhaust port 211, and the conversion pipe arrangement 212. At the same time, the inert gas is supplied to the processing area in the process chamber 201 via the gas supply holes 250a and 250c of the nozzles 249a and 249c, and discharged from the exhaust pipe 231 via the exhaust port 209a, the exhaust port 211, and the conversion pipe arrangement 212. At this time, the controller 121 performs a constant pressure control in which a first pressure is set as a target pressure.

In this case, for example, a silicon (Si)-containing gas may be used as the precursor gas. Specifically, a hexachlorodisilane ($Si_2Cl_6$, abbreviation: HCDS) gas may be used.

(S642: Precursor Gas Exhaust)

After the first layer is formed, the valve 243b is closed to stop the supply of the precursor gas, and the APC valve 244 is controlled to be fully opened. As a result, the inside of the process chamber 201 is vacuum-exhausted, and the precursor gas unreacted or contributed to the formation of the first layer, which remains in the process chamber 201, is discharged from the inside of the process chamber 201. Alternatively, the residual gas may be purged by supplying the inert gas into the process chamber 201 while leaving the valve 243g open. A flow rate of the purge gas from the nozzle 249b is set such that a partial pressure of a low-vapor-pressure gas is lower than a saturated vapor pressure in the exhaust path, or such that a flow velocity in the reaction tube 203 overcomes a diffusion velocity.

(S643: Oxidizing Gas Supply)

After step S642 is completed, the valve 243d is opened to allow an oxidizing gas to flow through the gas supply pipe 232d such that the wafer 200 in the process chamber 201, i.e., the first layer formed on the wafer 200, is supplied with the oxidizing gas. A flow rate of the oxidizing gas is regulate by the MFC 241d. The oxidizing gas is supplied to the processing area in the process chamber 201 via the gas supply holes 250a of the nozzle 249a, and discharged from the exhaust pipe 231 via the exhaust port 209a, the exhaust port 211, and the conversion pipe arrangement 212. At the same time, the valve 243f is opened to allow the inert gas to flow through the gas supply pipe 232f. A flow rate of the inert gas is regulated by the MFC 241f. The inert gas is supplied to the processing area in the process chamber 201 together with the oxidizing gas via the gas supply holes 250a of the nozzle 249a, and discharged from the exhaust pipe 231 via the exhaust port 209a, the exhaust port 211, and the conversion pipe arrangement 212. At the same time, the inert gas is supplied to the processing area in the process chamber 201 via the gas supply holes 410a and 430a of the nozzles 410 and 430, and discharged from the exhaust pipe 231 via the exhaust port 209a, the exhaust port 211, and the conversion pipe arrangement 212. At this time, the controller 121 performs a constant pressure control in which a second pressure is set as a target pressure.

In this case, for example, a gas constituted by oxygen (O) may be used as the oxidizing gas. A gas composed of oxygen may be used as the oxidizing gas. Specifically, an oxygen (O 2) gas may be used.

(S644: Oxidizing Gas Exhaust)

After a predetermined time elapses since the supply of the oxidizing gas is started, the valve 243d is closed to stop the supply of the oxidizing gas, and a constant pressure control (i.e., fully-opening control) is performed to set the target pressure to 0. As a result, the inside of the process chamber 201 is vacuum-exhausted, and the oxidizing gas unreacted or contributed to the formation of the first layer, which remains in the process chamber 201, is discharged from the inside of the process chamber 201. At this time, as in step S642, a predetermined amount of inert gas may be supplied into the process chamber 201 as a purge gas.

(S645: Nitriding Gas Supply)

After step S644 is completed, the valve 243a is opened to allow a nitriding gas to flow through the gas supply pipe 232d, such that the nitriding gas is supplied to the wafer 200 in the process chamber 201, i.e., the first layer formed on the wafer 200. A flow rate of the nitriding gas is regulated by the MFC 241a. The nitriding gas is supplied to the processing area in the process chamber 201 via the gas supply holes 250a of the nozzle 249a, and discharged from the exhaust pipe 231 via the exhaust port 209a, the exhaust port 211, and the conversion pipe arrangement 212. At the same time, the valve 243f is opened to allow the inert gas to flow through the gas supply pipe 232f. A flow rate of the inert gas is regulated by the MFC 241f. The inert gas is supplied to the processing area in the process chamber 201 together with the nitriding gas via the gas supply holes 250a of the nozzle 249a, and discharged from the exhaust pipe 231 via the exhaust port 209a, the exhaust port 211, and the conversion pipe arrangement 212. At the same time, the inert gas is supplied to the processing area in the process chamber 201 via the gas supply holes 410a and 430a of the nozzles 410 and 430, and discharged from the exhaust pipe 231 via the exhaust port 209a, the exhaust port 211, and the conversion pipe arrangement 212. At this time, the controller 121 performs a constant pressure control in which a third pressure is set as the target pressure. The first pressure, the second pressure, and the third pressure are 100 to 5000 Pa, for example.

In this case, for example, an ammonia ($NH_3$) gas may be used as the nitriding gas.

The expression of a numerical range such as "100 to 5000 Pa" in the present disclosure means that a lower limit and an upper limit are included in the range. Therefore, for example, "100 to 5000 Pa" means "100 Pa or more and 5000 Pa or less." The same applies to other numerical ranges.

(S646: Nitriding Gas Exhaust)

After a predetermined time elapses since the supply of the nitriding gas is started, the valve 243a is closed to stop the supply of the nitriding gas, and a constant pressure control (i.e., fully-opening control) is performed to set the target pressure to 0. As a result, the inside of the process chamber 201 is vacuum-exhausted, and the nitriding gas unreacted or contributed to the formation of the first layer, which remains in the process chamber 201, is discharged from the inside of the process chamber 201. At this time, as in step S642, a predetermined amount of inert gas may be supplied into the process chamber 201 as a purge gas. Ultimate pressures in the precursor gas exhaust, the oxidizing gas exhaust, or the nitriding gas exhaust are 100 Pa or less, specifically 10 to 50 Pa. The pressure inside the process chamber 201 may differ by a factor of ten or more between when the supply is performed and when the exhaust is performed.

(S647: Performing a Predetermined Number of Times)

By performing, a predetermined number of times (n times where n is an integer equal to or greater than 1), a cycle in which the above-described steps S641 to S647 are sequentially performed without overlapping in time, it is possible to form a film with a predetermined composition and a predetermined thickness on the wafer 200. For example, a silicon oxynitride film (SiON film) is formed by using a HCDS gas as the precursor gas, an $O_2$ gas as the oxidizing gas, and a $NH_3$ gas as the nitriding gas.

(Step S65: Purge Step)

After the film-forming process is completed, an inert gas as a purge gas is supplied into the process chamber 201 from each of the nozzles 249a to 249c, and discharged from the exhaust pipe 231 via the exhaust port 209a, the exhaust port 211, and the conversion pipe arrangement 212. As a result, the inside of the process chamber 201 is purged, and the gases and by-products remaining in the process chamber 201 are removed from the inside of the process chamber 201 (after-purge). Thereafter, the atmosphere in the process chamber 201 is replaced with an inert gas (inert gas replacement), and the pressure in the process chamber 201 is returned to the atmospheric pressure (returning to atmospheric pressure).

(S67: Boat Unloading, S68: Wafer Discharging)

Thereafter, the seal cap 219 is lowered by the boat elevator 115, and the lower end of the manifold 209 is opened. Then, the processed wafers 200 are unloaded to the outside of the reaction tube 203 from the lower end of the manifold 209 while being supported by the boat 217 (boat unloading). After the boat unloading, the shutter 219s is moved, and the lower end opening of the manifold 209 is sealed by the shutter 219s via the O-ring 220c (shutter closing). The processed wafers 200 are discharged from the boat 217 after being unloaded to the outside of the reaction tube 203 (wafer discharging).

(3) Effects of the Embodiments of the Present Disclosure

According to the embodiments of the present disclosure, one or more of the following effects may be obtained.

(a) The pipe 103 of the conversion pipe arrangement 212 includes an internal space formed in a polyhedral shape, and allows fluid communication between the substantially rectangular first opening 101a and the substantially circular second opening 102a. This makes it possible to convert the shape.

(b) The pipe 103 of the conversion pipe arrangement 212 includes an internal space formed in a polyhedral shape, and allows fluid communication between the substantially rectangular first opening 101a and the substantially circular second opening 102a. This reduces the step during conversion from a quadrangular pipe to a round pipe and eliminates stagnation of a gas flow at corners, thereby preventing deposition of by-products on the corners and suppressing the generation of particles.

(c) Since the pipe 103 is constituted by a polyhedron, it is easier to manufacture the pipe 103 than when the pipe 103 is constituted by a complicated curved surface.

(d) Since the pipe 103 is constituted by a polyhedron, a length of the pipe for conversion may be shortened.

(e) The first connector 101 of the conversion pipe arrangement 212 is detachably connected to the opening of the counterpart (the opening of the exhaust port 211). As a result, the first connector 101 may be separated from the manifold 209 instead of being integrated with the manifold 209, such that the attachment and detachment of the manifold 209 is not hindered.

(f) The pipe 103 is configured such that the first straight line (pipe axis) 111 perpendicularly passing through the center of the first opening 101a does not coincide with the second straight line (pipe axis) 112 perpendicularly passing through the center of the second opening 102a. This allows offset conversion.

(g) The area of the opening 102d of the second connector 102 is equal to or larger than the area of the first opening 101a, and the pipe 103 is configured such that the flow path cross-sectional area continuously changes between the open surface 103b connected to the first opening 101a and the open surface 103c connected to the opening 102d of the second connector 102. As a result, a diameter conversion may be performed.

(h) The pipe 103 may simultaneously perform a shape conversion, a diameter conversion, and an offset conversion with one pipe arrangement. Thus, as compared with the case where a stepwise conversion is performed by a plurality of members, unevenness of the flow path is reduced, which makes it possible to reduce a conductance. In addition, the number of connectors where a temperature of pipe arrangement heating tends to be low may be reduced, thereby reducing the deposition of by-products. Further, a dead space is reduced.

(i) Since the diameter conversion may be performed for the pipe 103, it is possible to increase a diameter of the exhaust pipe 231. As a result, an exhaust efficiency is improved, which makes it possible to increase a flow rate of the precursor gas flowing through the process chamber 201. As a result, it is possible to perform a film-forming process for a device with fine patterns and a device with a three-dimensional structure for which three-dimensionalization of a device structure or miniaturization of patterns progresses and thus a higher film uniformity is demanded.

Other Embodiments of the Present Disclosure

Embodiments of the present disclosure are specifically described above. However, the present disclosure is not limited to the embodiments described above, and may be modified in various ways without departing from the scope of the present disclosure.

In the above-described embodiments, the example is described in which a film is formed by using a batch-type substrate processing apparatus configured to process a plurality of substrates at a time. The present disclosure is not limited to the above-described embodiments, but may be suitably applied to, for example, a case where a film is formed by using a single-wafer type substrate processing apparatus configured to process one or several substrates at a time. Further, in the above-described embodiments, the example is described in which a film is formed by using a substrate processing apparatus including a hot-wall-type process furnace. The present disclosure is not limited to the above-described embodiments but may also be suitably applied to a case where a film is formed by using a substrate processing apparatus including a cold-wall-type process furnace.

Even when these substrate processing apparatuses are used, each process may be performed under the same processing procedures and processing conditions as those of the above-described embodiments, and effects similar to those of the above-described embodiments may be obtained.

According to the present disclosure in some embodiments, it is possible to reduce stagnation of a gas flow in an exhaust pipe.

While certain embodiments are described above, these embodiments are presented by way of example, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A conversion pipe arrangement, comprising:
    a first connector including a first opening including two longitudinally extending parallel sides and configured to provide a detachable connection to an opening of a first counterpart;
    a second connector including:
        a plate that has a five-or-more sided polygonal contour;
        a substantially circular second opening that is formed to be opened on one side of the plate and configured to be connectable to an opening of a second counterpart; and
        a five-or-more sided polygonal third opening that is formed to be opened on another side of the plate, which is opposite to the one side;
    a pipe including an internal space formed in a shape of a polyhedron and configured to allow fluid communication between the first opening and the second opening; and
    a circular member that is connected to the second opening.

2. The conversion pipe arrangement of claim 1, wherein the first opening is substantially rectangular, and the internal space formed in the shape of the polyhedron is connected to the first connector in a quadrangular shape and connected to the second connector in a polygonal shape of five-or-more sided polygon.

3. The conversion pipe arrangement of claim 1, wherein the first opening and the second opening are formed in parallel so as to be opened in opposite directions to each other.

4. The conversion pipe arrangement of claim 1, wherein the first connector includes a first flange directly connected to the first counterpart at a flat sealing surface.

5. The conversion pipe arrangement of claim 1, further comprising:
    a second flange directly connected to the opening of the second counterpart at a flat sealing surface; and
    a bellows configured to connect the second opening of the second connector and the second flange in a fluid communication state.

6. The conversion pipe arrangement of claim 1, wherein the internal space formed in the shape of the polyhedron includes an open surface connected to the first connector, an open surface connected to the second connector, four or more trapezoidal surfaces, and two or more triangular surfaces arranged between each of the trapezoidal surfaces.

7. The conversion pipe arrangement of claim 6, wherein the open surface connected to the second connector is octagonal, and the triangular surfaces are four triangular surfaces.

8. The conversion pipe arrangement of claim 6, wherein the trapezoidal surfaces are formed by a flat plate or a curved plate including a trapezoidal contour, the triangular surfaces are formed by a flat plate or a curved plate including a triangular contour, and the pipe is formed by welding sides of the trapezoidal surfaces and sides of the triangular surfaces.

9. The conversion pipe arrangement of claim 1, wherein the plate has an octagonal contour, and
    wherein a cross section of the third opening is greater than that of the second opening.

10. The conversion pipe arrangement of claim 1, wherein the pipe is formed by airtightly joining at least two shells divided in a plane perpendicular to the first opening or the second opening.

11. The conversion pipe arrangement of claim 10, wherein the at least two shells are made of a nickel alloy and formed by bending a flat plate.

12. The conversion pipe arrangement of claim 1, wherein a first straight line perpendicularly passing through a center of the first opening does not coincide with a second straight line perpendicularly passing through a center of the second opening.

13. The conversion pipe arrangement of claim 12, wherein the first straight line and the second straight line are parallel to each other and spaced apart from each other in a direction perpendicular to a longitudinal direction of the first opening.

14. The conversion pipe arrangement of claim 12, wherein the first opening is connected to an exhaust port extending at an upward and outward angle from the process chamber of a substrate processing apparatus, and the second opening is connected to a vacuum pump.

15. The conversion pipe arrangement of claim 1, wherein an area of the second opening is equal to or larger than an area of the first opening, and
wherein the pipe is configured such that a flow path cross-sectional area continuously changes between an open surface connected to the first connector and an open surface connected to the second connector.

16. The conversion pipe arrangement of claim 1, wherein the first opening is connected to a process chamber of a substrate processing apparatus, and the second opening is connected to an exhauster.

17. A substrate processing apparatus, comprising:
the conversion pipe arrangement of claim 1;
a reaction tube including an opening through which a substrate is capable of being loaded and unloaded;
a cylindrical inlet connected to the opening of the reaction tube; and
an exhaust port formed on a side surface of the inlet,
wherein the exhaust port includes a tubular body extending at an upward and outward angle from the inlet and a flange to which the first connector is connected, and
wherein the tubular body has a rectangular cross section.

18. The substrate processing apparatus of claim 17, wherein the second connector is flush with one surface of a casing of the reaction tube.

19. A method of processing a substrate, comprising:
processing the substrate with a gas by utilizing a substrate processing apparatus; and
discharging the gas by utilizing the conversion pipe arrangement of claim 1,
wherein the substrate processing apparatus includes:
a reaction tube including an opening through which a substrate is capable of being loaded and unloaded;
a cylindrical inlet connected to the opening of the reaction tube; and
an exhaust port formed on a side surface of the inlet,
wherein the exhaust port includes a tubular body extending at an upward and outward angle from the inlet and a flange to which the first connector is connected, and
wherein the tubular body has a rectangular cross section.

20. A method of manufacturing a semiconductor device, comprising:
manufacturing the semiconductor device with a gas by utilizing a substrate processing apparatus of claim 16; and
manufacturing the gas by utilizing the conversion pipe arrangement of claim 1,
wherein the substrate processing apparatus includes:
a reaction tube including an opening through which a substrate is capable of being loaded and unloaded;
a cylindrical inlet connected to the opening of the reaction tube; and
an exhaust port formed on a side surface of the inlet,
wherein the exhaust port includes a tubular body extending at an upward and outward angle from the inlet and a flange to which the first connector is connected, and
wherein the tubular body has a rectangular cross section.

* * * * *